(12) United States Patent
Turos (10) Patent No.: US 6,631,660 B2
(45) Date of Patent: Oct. 14, 2003

(54) SELF-ALIGNING ARBOR SYSTEM

(75) Inventor: Kenneth Turos, Albuquerque, NM (US)

(73) Assignee: Sun Standard, Inc., Albuqueraue, NM (US)

(*) Notice: Subject to any disclaimer, the term of this patent is extended or adjusted under 35 U.S.C. 154(b) by 20 days.

(21) Appl. No.: 09/844,029

(22) Filed: Apr. 26, 2001

(65) Prior Publication Data

US 2002/0157509 A1 Oct. 31, 2002

(51) Int. Cl.$^7$ ............................................. B23B 25/00
(52) U.S. Cl. .......................... 82/112; 82/168; 411/432; 411/533
(58) Field of Search .................... 82/165, 112, 152, 82/153, 164, 170, 1.11, 103, 168; 411/432, 533, 542, 371.1, 147, 135, 136; 470/326; 409/234; 83/665, 666; 279/100, 101, 141

(56) References Cited

U.S. PATENT DOCUMENTS

| | | | | |
|---|---|---|---|---|
| 1,328,279 A | * | 1/1920 | Grauer | 408/200 |
| 2,941,451 A | * | 6/1960 | Hanson et al. | 409/234 |
| 3,352,341 A | * | 11/1967 | Schertz | 411/270 |
| 3,386,771 A | * | 6/1968 | Verdier et al. | 301/35.625 |
| 3,520,342 A | * | 7/1970 | Scheffer | 411/303 |
| 3,540,165 A | * | 11/1970 | Lanham | 451/398 |
| 3,830,133 A | * | 8/1974 | Jepsen et al. | 411/432 |
| 4,378,187 A | * | 3/1983 | Fullerton | 411/237 |
| 4,433,578 A | * | 2/1984 | Hill | 157/21 |
| 4,507,999 A | | 4/1985 | Dezern | 83/665 |
| 4,717,299 A | * | 1/1988 | Underwood | 411/11 |
| 4,730,952 A | | 3/1988 | Wiley | 403/316 |
| 4,969,788 A | * | 11/1990 | Goiny | 411/428 |
| 4,979,857 A | * | 12/1990 | Wing | 411/5 |
| 5,095,786 A | * | 3/1992 | Bellinghausen et al. | 82/112 |
| 5,100,275 A | * | 3/1992 | Schirrmacher | 269/184 |
| 5,481,951 A | | 1/1996 | Kiefer | 82/162 |
| 5,653,153 A | | 8/1997 | Greenwald | 82/1.11 |
| 5,737,985 A | | 4/1998 | Rimlinger, Jr. | 82/165 |
| 5,902,084 A | * | 5/1999 | Garcia | 411/428 |
| 5,906,230 A | | 5/1999 | Silver | 142/53 |
| 5,996,454 A | | 12/1999 | Brinks, Jr. | 82/151 |
| 6,109,157 A | | 8/2000 | Talesky | 83/666 |
| 6,279,919 B1 | * | 8/2001 | Turos | 279/133 |
| 2001/0026052 A1 | * | 10/2001 | Turos | 279/133 |

OTHER PUBLICATIONS

Random House College Dictionary, revised edition, 1980, p. 1330.*

*The Road & Track Illustrated Automotive Dictionary*, ©2000 John Dinkel, Bentley Publishers, pp. 66 and 72.

* cited by examiner

*Primary Examiner*—Daniel W. Howell
(74) *Attorney, Agent, or Firm*—Law Office of Ray R. Regan, P.A.

(57) ABSTRACT

A self-aligning arbor nut system is disclosed. The self-aligning arbor nut system, according to the present invention, includes a body formed with a duct substantially coincident with the longitudinal axis of the body. A substantially circular ring known as a swivel also is provided. The ring is engageable with either end of the duct. An o-ring is included. The o-ring is engageable with a groove in the wall of the ring, and with a slot formed on the inner surface of the duct at both ends of the duct to reverse engagement of the nut with an arbor. The swivel is engageable with at least one end of the body, and in fact is engageable with both ends of the body. When mounted on an arbor, the swivel aligns and helps prevent a bent or distorted arbor. A circumferential depression may be formed around the outside surface of the body. One or more bores is formed in the circumferential depression for manipulation with a key. A knurled surface is formed on the outside surface of the body to assist in hand gripping of the system when installed on an arbor.

19 Claims, 6 Drawing Sheets

SELF-ALIGNING ARBOR SYSTEM

FIELD OF THE INVENTION

The present invention pertains generally to arbor nuts. More particularly, the new and useful invention claimed in this document pertains to a self-aligning arbor system that overcomes unwanted effects of various forces on a rotor, drum such as a brake drum, adapter components, and related components on a rotating arbor. The present invention is particularly, but not exclusively, useful for use in connection with arbors on vehicular brake lathes.

BACKGROUND OF THE INVENTION

A motor vehicle brake is any mechanical device for arresting the motion of a wheel or a vehicle by means of friction. Kinetic energy is converted into heat energy through the use of frictional force applied to the wheels, causing a car to slow or stop. One component of a modern motor vehicle brake is a brake disc, which is the rotating part of a disc brake; the disc often is called a rotor. Another component of a drum brake system is a drum-shaped metal cylinder attached to the inner surface of the wheel that rotates with the wheel. See, for example, *The Road & Track Illustrated Automotive Dictionary*, © 2000 John Dinkel, Bentley Publishers, pages 66 and 72. Due to significant heat, to forces applied during braking, and to the environment in which brake systems operate, rotors are subjected to warp, damage, and wear, yet may be correctable and repairable. A rotor or drum may be resurfaced, refinished or otherwise ground or shaped (collectively, "resurfaced") on a brake lathe. While the present invention is useful in connection with resurfacing at least disks and drums of vehicular brakes, to avoid repetition, primary reference will be made to rotors in this document.

Resurfacing a rotor results in a less expensive aftermarket replacement part. An exemplary brake lathe adapter system for securing a workpiece like a rotor to a rotatable machine member such as an arbor used in the resurfacing process is disclosed in U.S. application Ser. No. 09/394,381, filed on Sep. 9, 1999, since issued as U.S. Pat. No. 6,279,919 B1, issued Aug. 28, 2001, a document incorporated by reference into this document, which names as the sole inventor the inventor of the present invention. Using a brake lathe to resurface, refinish or otherwise work on a rotor associated with a brake system of a car, truck, or other motor vehicles is a major after-market industry in the United States. At least one report of the Automotive Market Research Council indicated projections of sales of aftermarket brake products would increase almost 11% between 1997 and 2000. In the year 2000, sales of drums and rotors were projected to approximate $938,000,000.

Annually, a significant portion of brake rotors and drums are resurfaced, refinished or otherwise worked on by mounting a rotor on a shaft (frequently called an "arbor") of a brake lathe machine, securing the brake rotor in a brake lathe adapter, causing the arbor to rotate, and applying one or more tools to the surface of the rotor to resurface, refinish or otherwise perform work on one or more surfaces of the rotor.

At least one of the purposes of a brake lathe adapter and an arbor nut, or arbor locking nut, is to ensure parallelism in a resurfaced rotor. Tolerances are frequently as demanding as plus-or-minus 0.001 inch. Objectives include eliminating runout and taper of the rotor surface, also known as wobbling. Spacers and adapters may be used to keep a rotor's axis substantially perpendicular to the longitudinal axis of the rotating arbor. Excessive torque applied to an locking arbor nut also may significantly affect the parallelism of a refinished rotor.

During refinishing or resurfacing of a rotating workpiece mounted on a rotatable shaft, a rotor and an arbor may be subjected to a variety of forces, and phenomena resulting from such forces. In general, forces due to rotation and gravity tend to preclude uniform rotation of a rotating shaft and a rotating workpiece such as a rotor in a single, unvarying plane of rotation. If the workpiece is a rotor or drum, such as a brake rotor or brake drum mounted on a rotating arbor of a machine such as a lathe, forces acting on the arbor and workpiece during rotation of the arbor and workpiece may distort one or more planes and axes of rotation in connection with the rotor, and exert a variety of angular and planar forces that may affect how accurately and quickly an operator of the lathe may work on the rotor. Forces and force vectors may cause harmonics and vibrations that may be transmitted to the shaft, rotor and other components of the lathe during rotation. Any nonuniform rotation of a rotor during a resurfacing operation may cause a cutting tool brought in contact with a rotor to produce an inferior surface on a working area or surface of a rotor.

During operation of a brake lathe arbor forces include gravity, friction, velocity of rotation, and a variety of load forces applied during operation to bearings, driven shafts, turning spindles, retaining devices, locking nuts, and other components of driving machines and driven shafts (collectively, "machine members"). Similar forces may be induced in a rotor. For example, circular rotation of arbors may give rise to centripetal force, a force that may be reacted to by centrifugal reaction. Angular velocity and angular acceleration of rotating workpieces subjected not only to varying velocities during operation, but also to differing loads or pressures, also may cause gyroscopic effects on a rotor that may turn or rotate over a range of different speeds. Machine members and workpieces also may be subjected to significant loads about their geometric and rotational axes. When more than one force act on a rotatable arbor, a torque may be formed whose vector along an x-axis may produce a rotation about the y-axis known as precession. Such rotation may generate significant angular velocities. All of the foregoing forces, phenomena, torque and related effects (collectively, "forces") may individually and collectively contribute to causing nonuniform rotation of an arbor and a workpiece attached to an arbor.

In addition to such forces, angular accelerations and velocities may be present in connection with rotating machine members, leading to unbalanced forces that may induce high harmonics, chattering, and vibrations. In some but not all instances, if the speed of rotation of a shaft is slowly increased from rest, a speed may be achieved at which a deflection increases suddenly, a phenomenon known as "whirling." A shaft that is balanced will rotate around the center of gravity or axis of rotation of a shaft. A shaft rotating at an angular velocity, however, may deflect a distance from the center of gravity or axis of rotation due to centripetal reaction. An unbalanced shaft, for example an arbor that has been deflected or bent and therefore does not rotate around a true center of rotation, also presents additional rotational problems. Rotation also may induce undamped free vibrations.

A variety of apparatus have been proposed to reduce or eliminate such forces and phenomena, seeking to enable a machine operator, including a brake lathe operator, to more effectively resurface a rotating workpiece such as a brake rotor. As indicated, an exemplary solution to the problems is presented by the brake lathe adaptor system disclosed in U.S. application Ser. No. 09/394,381 since issued as U.S. Pat. No. 6,279,919 B1, issued Aug. 28, 2001.

Overlooked, however, until now, among components other than a brake lather adaptor system for an effective brake lathe system has been the arbor nut, or arbor locking nut (collectively, "arbor nut"). At least one objective of the components, individually or collectively, used to position a rotor on an arbor is to position the rotor during operation substantially perpendicular to the rotating arbor. In turn, that objective seeks to overcome the inherent effect of forces that induce vibration and chattering in the rotor. The typical conventional arbor nut is not capable of applying a consistent, predictable, uniform force against brake lather adapter components along the longitudinal axis of the arbor in the direction of the brake lather adapter components ("lateral force"). In addition, a common unwanted occurrence during a resurfacing operation is for a brake lathe operator to apply too much torque to tightening a conventional arbor nut. An arbor nut placed too tightly against one of the components of a brake lathe adapter may induce unwanted forces that the brake lather adapter has overcome. Also, over-tightening an arbor nut can also bend or otherwise distort the arbor itself during rotation. A distortion of the arbor may reduce the effectiveness of the brake lathe adapter in controlling the unwanted forces. A distorted arbor also may make the brake lather nonoperational without a brake lathe operator being aware of the problem. The conventional arbor nut does not compensate for a bent or otherwise distorted arbor.

At least one prior approach for solving the problem suggests use of two components, a conventional arbor nut, and a spacer-adapter. The spacer-adapter may be located on the arbor between the arbor nut and the first surface of the components assembled to hold the rotor in place on the arbor. However, because there are two separate components, angular offsets in planes perpendicular to the arbor may vary significantly in either direction of possible rotation around an axis through the longitudinal axis through the arbor.

Therefore, a previously unaddressed need exists in the industry for a new and useful self-aligning arbor nut system, and method for making the apparatus, that achieves at least three objectives: It should be self-aligning; it should, for example, compensate for a bent or distorted arbor to enable the operator of a brake lathe to repetitively produce a parallel resurfaced brake rotor. It should be hand-tightenable against a workpiece on a rotor. It should contribute to over-all safety during operation of a brake lathe. There exists a need for a self-aligning arbor nut system capable of preventing application of over-torque on an arbor nut. Particularly, there is a significant need for a method and apparatus that contributes to overcoming the unwanted effects of forces that induce vibration and chattering in the rotor. Also useful would be a self-aligning arbor nut system capable of applying a consistent, predictable, uniform lateral force against the brake lather adapter components along the longitudinal axis of the arbor in the direction of the brake lather adapter components, and to compensate for a bent or distorted arbor. A self-aligning arbor nut system should allow an operator of a brake lathe to apply the appropriate amount of torque when tightening the arbor nut system. Such an arbor nut system would not induce unwanted forces that the brake lather adapter has overcome, and would not bend or otherwise distort the arbor itself during rotation.

SUMMARY OF THE INVENTION

Given the conventional solutions for solving the problem of overcoming the unwanted effects of various forces on a rotor, adapter components, and a rotating arbor, it would be desirable, and of considerable advantage, to provide a self-aligning arbor nut system that is alignable by hand, so as to reduce the undesirable results of over-torquing a conventional arbor nut that is tightened onto an arbor using a large wrench. It would also be advantageous to provide such a self-aligning arbor nut system that could be removed from the arbor by hand, but also could be removable by use of a key or similar tool.

The present invention provides numerous advantages in overcoming unwanted effects of various forces on a rotor, adapter components, and a rotating arbor. At least one advantage of the present invention is that it contributes to positioning a rotor by hand on an arbor during operation of a rotatable arbor to hold a work piece substantially perpendicular to the rotating arbor. Accordingly, the present invention helps overcomes the effect of forces that induce vibration and chattering in the rotating work piece, such as a brake rotor. Another advantage of the self-aligning arbor nut system is its capability to apply consistent, predictable, uniform forces against other components mounted on a rotor, including components of a brake lather adapter. Yet another advantage of the present invention is its ability to hold components in place along the longitudinal axis of the arbor in the direction of the brake lather adapter components, thus helping to overcome chatter and similar movement in a rotor. Still another advantage of the self-aligning arbor system is solution for avoiding application of too much torque by an operator of a brake lathe when mounting the self-aligning arbor nut system on an arbor. An arbor nut placed too tightly against a component of a brake lathe adapter may induce unwanted forces that the brake lather adapter has overcome. The self-aligning arbor nut system of the present invention also helps prevent distortion or bend in the arbor. The present invention contributes to overall safety in the use of brake lathes by providing a surface for the apparatus that is cylindrical rather than edged due to the hexagonal shape of the typical conventional arbor nut, thus helping to prevent injury caused by those edges if the body of an operator or user of the invention should come in contact with the rotating nut. Yet another advantage of the present invention is a self-aligning arbor system, and a method for making and manufacturing a self-aligning arbor system, which respectively are easy to use and to practice, and which are cost effective for their intended purposes.

These and other advantages are achieved in the present invention by providing a self-aligning arbor system that includes a body formed with a duct substantially coincident with the longitudinal axis of the body. A ring known as a swivel also is provided. The ring is engageable with at least one end of the duct and with the arbor using threaded surfaces. An o-ring is included that is engageable with a groove in the wall of the ring, and with a slot formed on the inner surface of the duct. The swivel is therefore engageable with at least one end of the body. In fact, the invention is reversible, meaning that the body is formed such that the swivel may be inserted into the other end of the duct to adjust for difference in arbor lengths. A circumferential depression may be formed around the outside surface of the body. One or more bores is formed in the circumferential depression for manipulation with a key. A series of indentations and ridges, or knurled surface, are formed on the outside surface of the body to assist in hand gripping of the system when installed on an arbor.

The advantages and other objects of the present invention, and features of such a self-aligning arbor nut system, will become apparent to those skilled in the art when read in conjunction with the accompanying following description, drawing figures, and appended claims.

The foregoing has outlined broadly the more important features of the invention to better understand the detailed description which follows, and to better understand the contribution of the present invention to the art. Before explaining at least one embodiment of the invention in detail, it is to be understood that the invention is not limited in application to the details of construction, and to the arrangements of the components, provided in the following description or drawing figures. The invention is capable of other embodiments, and of being practiced and carried out in various ways. Also, the phraseology and terminology employed in this disclosure are for purpose of description, and should not be regarded as limiting.

As those skilled in the art will appreciate, the conception on which this disclosure is based readily may be used as a basis for designing other structures, methods, and systems for carrying out the purposes of the present invention. The claims, therefore, include such equivalent constructions to the extent the equivalent constructions do not depart from the spirit and scope of the present invention. Further, the abstract associated with this disclosure is neither intended to define the invention, which is measured by the claims, nor intended to be limiting as to the scope of the invention in any way.

The novel features of this invention, and the invention itself, both as to structure and operation, are best understood from the accompanying drawing, considered in connection with the accompanying description of the drawing, in which similar reference characters refer to similar parts, and in which:

DESCRIPTION OF THE PREFERRED EMBODIMENTS

Briefly, the present invention provides a self-aligning arbor nut system that includes a body formed with a duct substantially coincident with the longitudinal axis of the body. A ring known as a swivel also is provided. The ring is engageable with at least one end of the duct and with the arbor using threaded surfaces. An o-ring is included. The o-ring is engageable with a groove in the wall of the ring, and with a slot formed on the inner surface of the duct. A circumferential depression may be formed around the outside surface of the body. One or more bores is formed in the circumferential depression for manipulation with a key. A series of indentations, or knurled surface, are formed on the outside surface of the body to assist in hand gripping of the system when installed on an arbor. The present invention, therefore, is useful for aligning the nut in relation to the arbor, and for using hand pressure and torque to mount and remove the nut on an arbor.

Figure 1A:
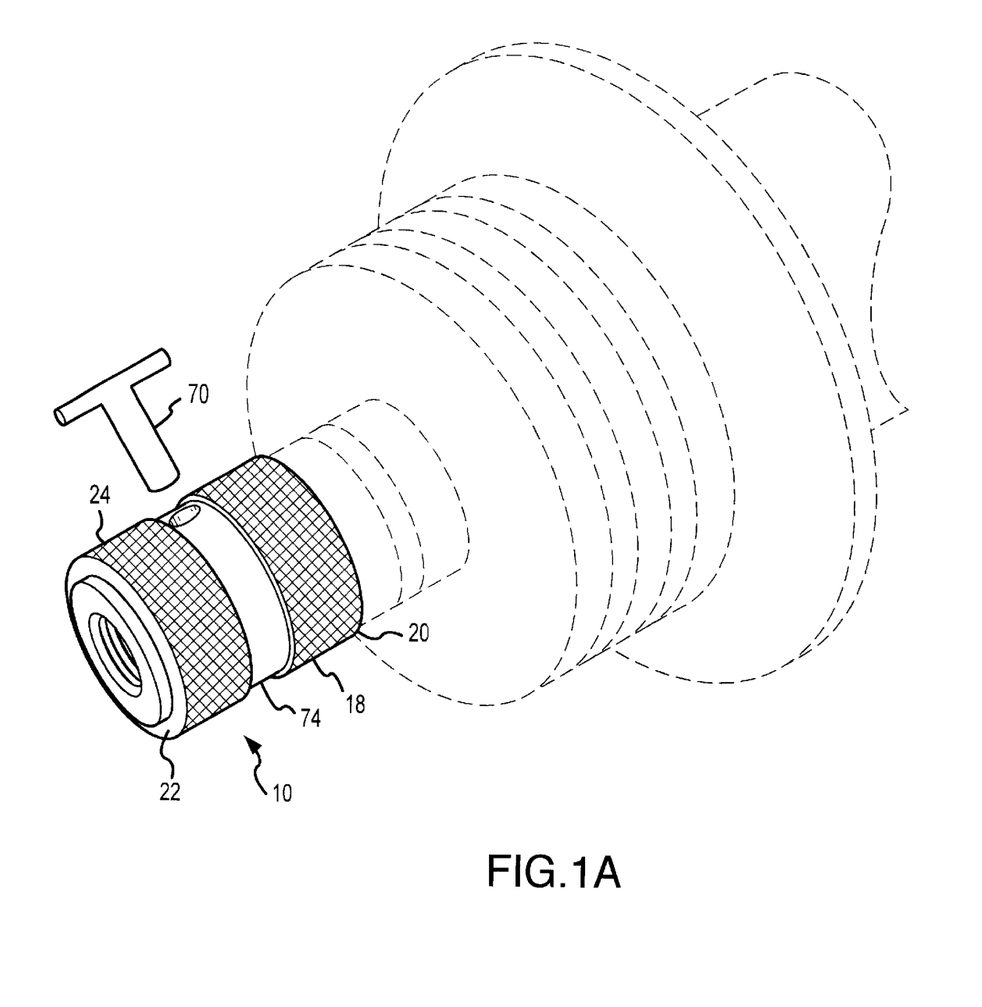
FIG. 1A is a perspective view of the self-aligning arbor nut system mounted in an operative environment on a brake lathe to secure at least a brake lathe adapter set shown in dashed lines.

Specifically, FIG. 1A illustrates a perspective view of the self-aligning arbor nut system 10 mounted in an operative environment. The operative environment is perhaps most clearly shown by cross-references to FIG. 1B which shows one example of a brake lathe adapter system 12 mounted on a shaft or arbor 14 of a brake lathe 16 (partially shown).

Figure 1B:
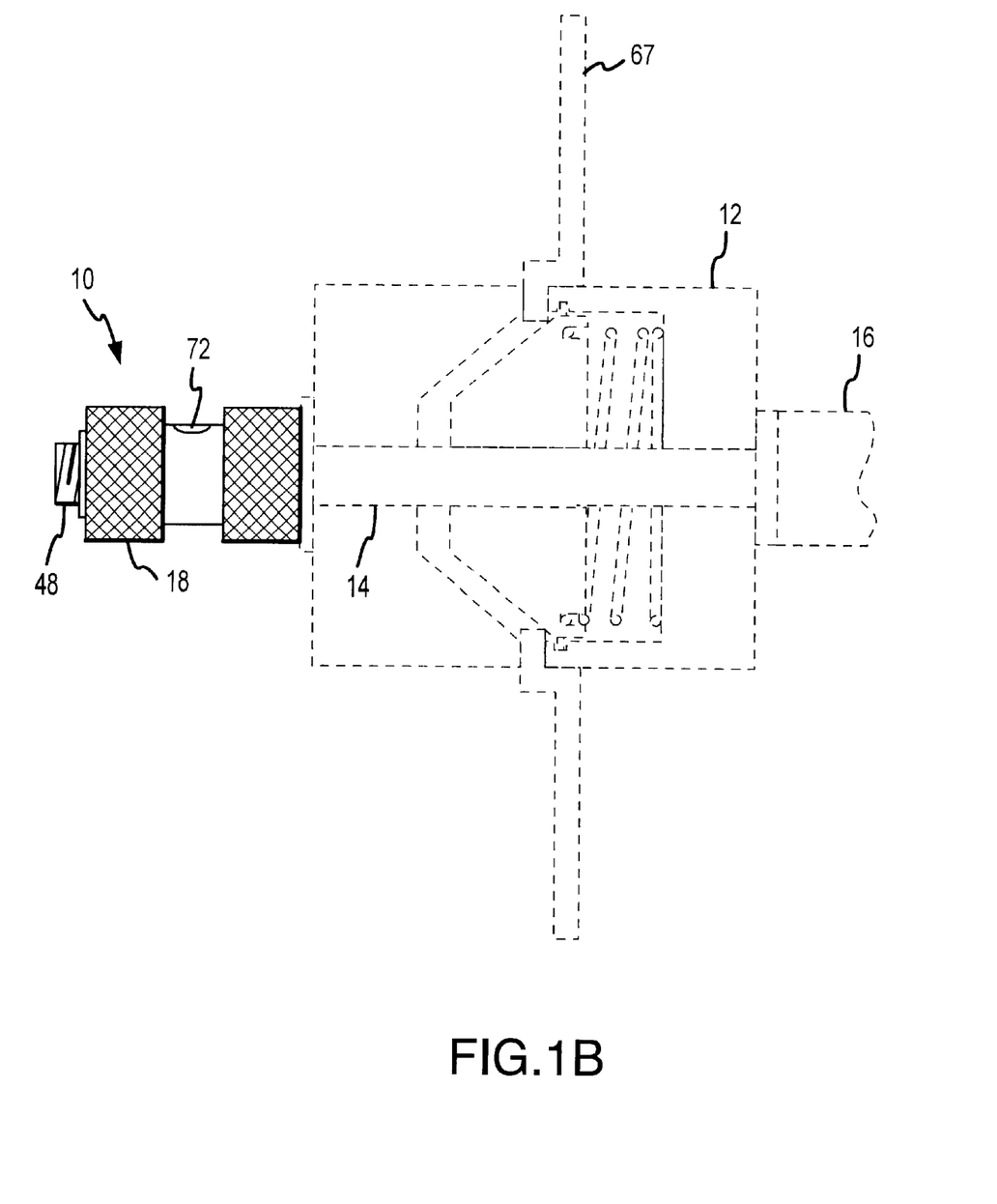
FIG. 1B is a side cross-sectional view along the line 1—1 in FIG. 1A showing a brake late adapter set and rotor to be resurfaced in dashed lines mounted on an arbor of a brake lathe.
Figure 2A:
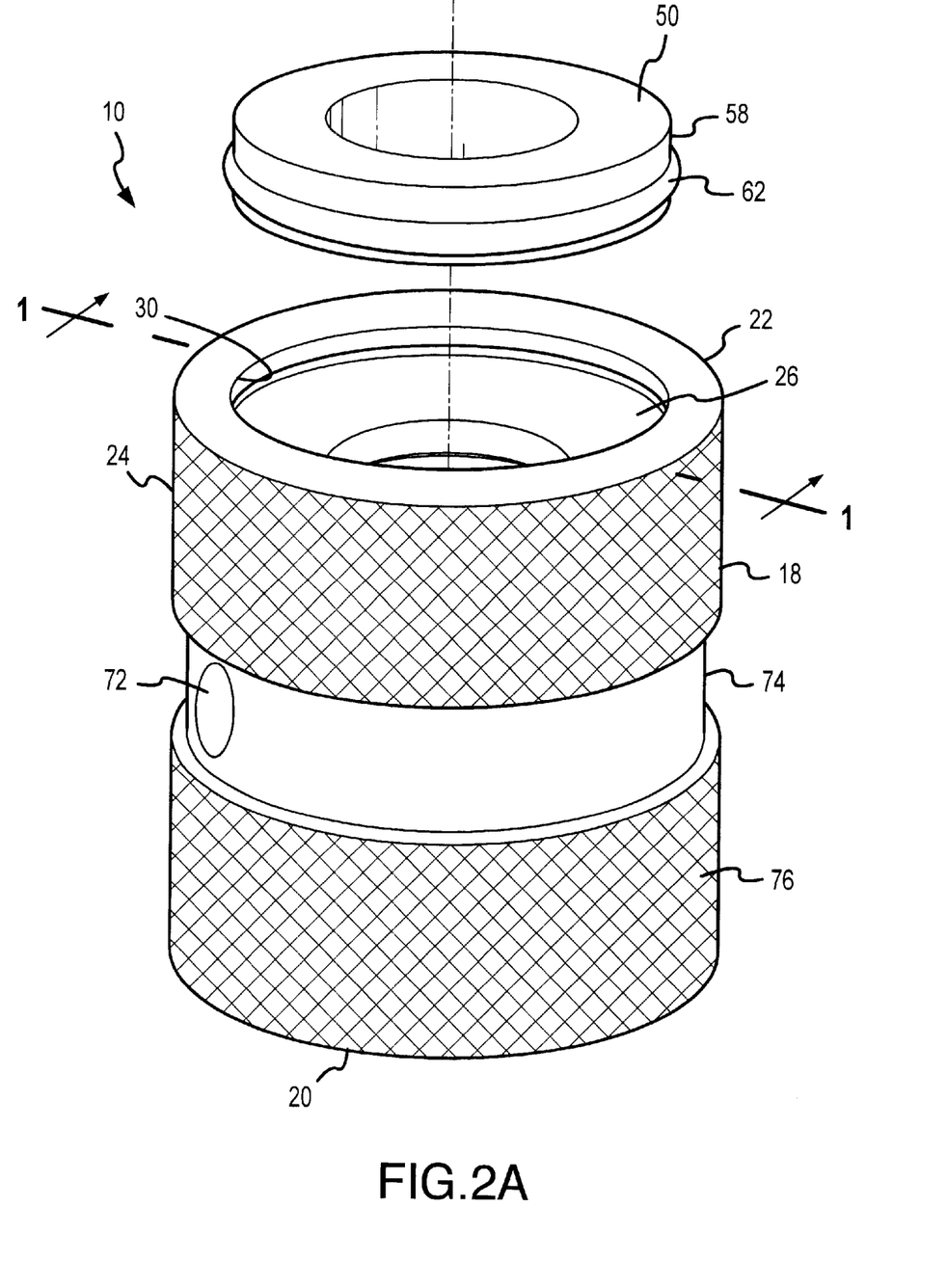
FIG. 2A is a perspective exploded view of the self-aligning arbor nut system unmounted.
Figure 2B:
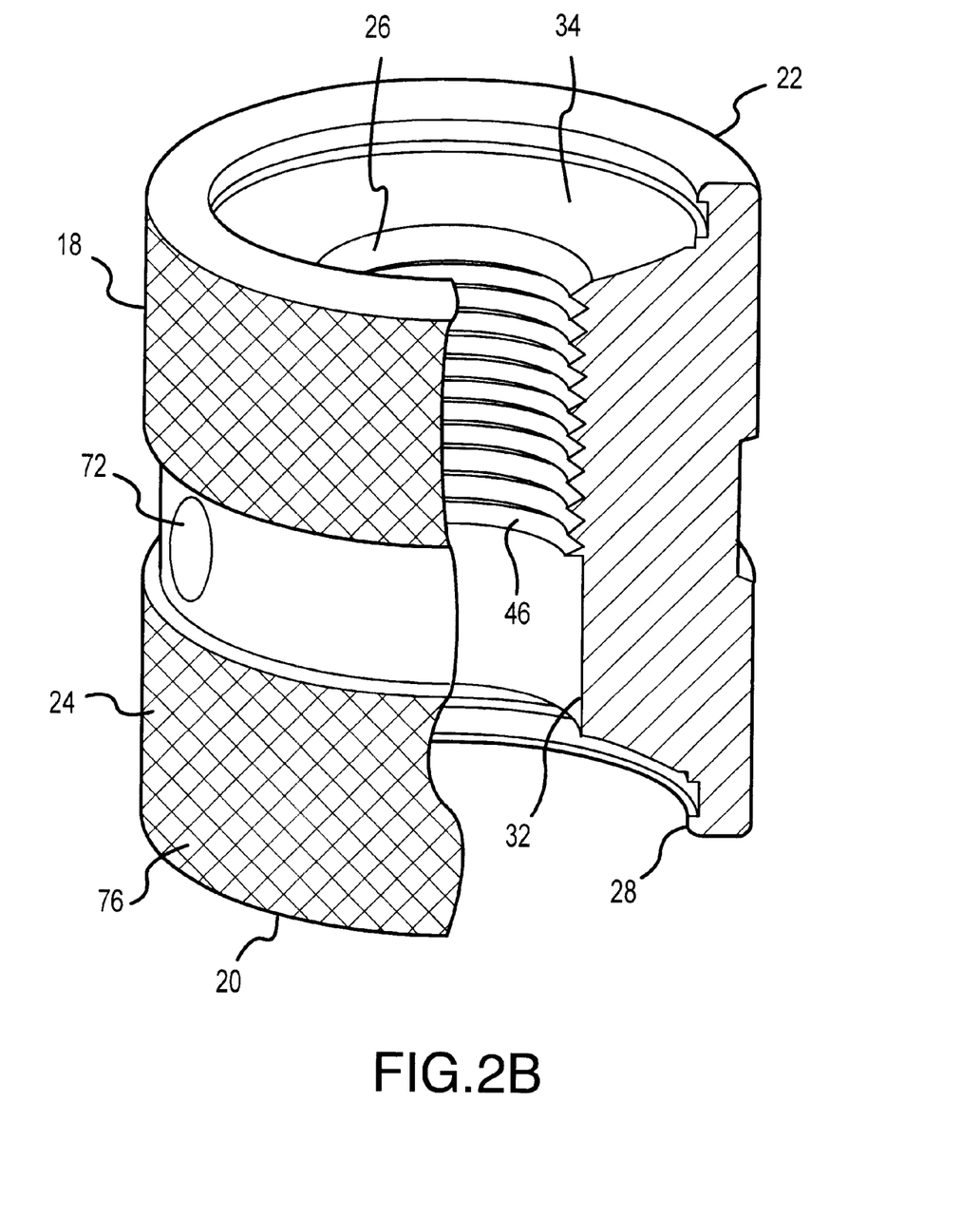
FIG. 2B is a perspective exploded and partially cut-away view of the self-aligning arbor nut system unmounted of the present invention.
Figure 4:
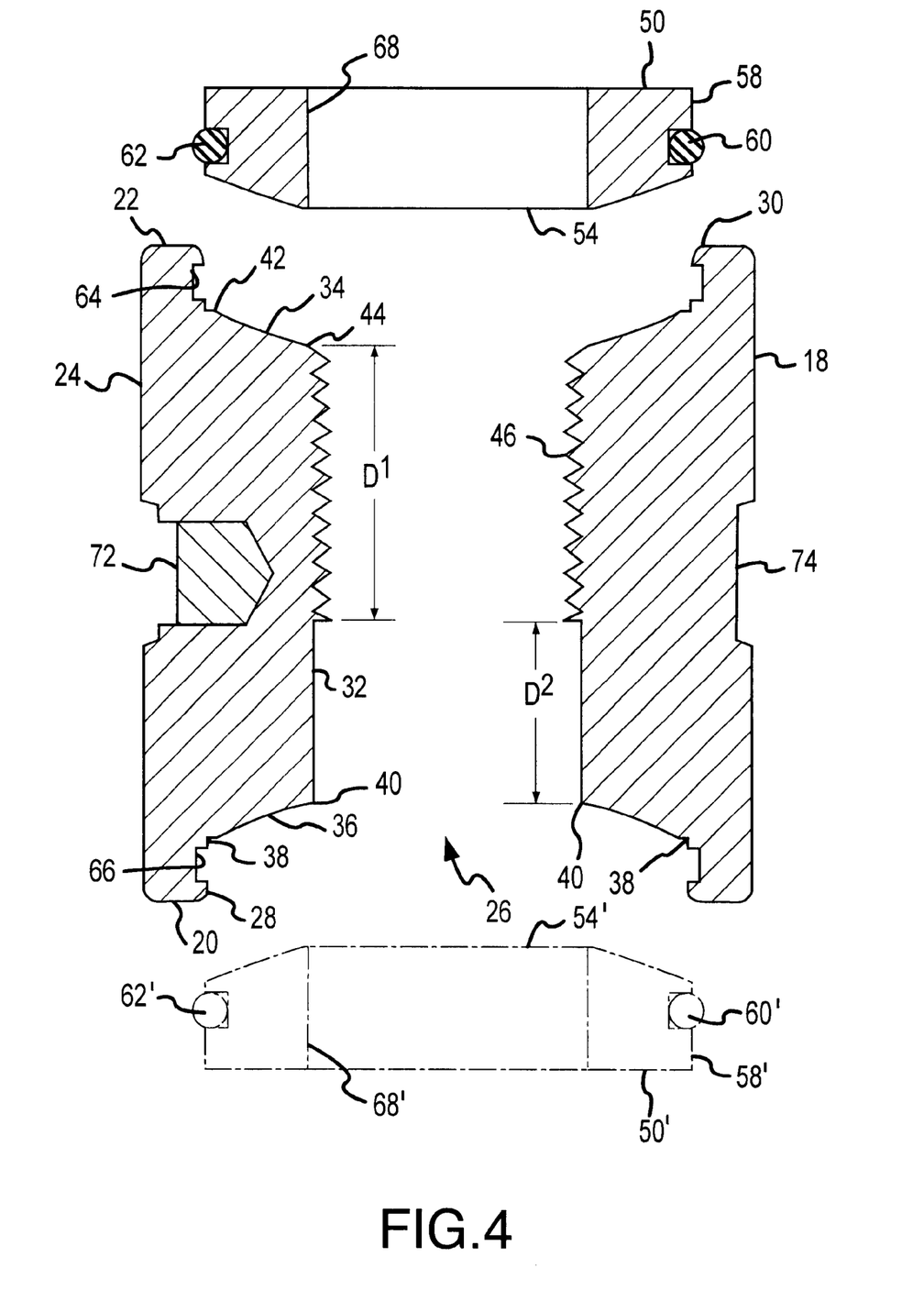
FIG. 4 is a cross-sectional view along the line 1—1 in FIG. 2A of the swivel and body of the self-aligning arbor nut system.

Self-aligning arbor nut system 10, as shown by cross-reference among FIGS. 2A, 2B and 4, includes a body 18. In a preferred embodiment of the present invention body 18 is manufactured of a single material such as steel. As will be evident, however, to a person skilled in the art, body 18 may be made of a wide variety of materials. Body 18 is provided with a distal end 20, a proximal end 22, and an outside surface 24 between distal end 20 and proximal end 22. Body 18 also is formed with a duct 26. Duct 26 is formed with a leading end 28, a following end 30, and an inner surface 32 between leading end 28 and following end 30. In a preferred embodiment of duct 26, as shown by reference to FIG. 4, duct 26 is formed with a first inwardly radial shoulder 34 adjacent leading end 28 of duct 26, and a second inwardly radial shoulder 36 adjacent following end 30 of duct 26. Referring to FIG. 4, second inwardly radial shoulder 36 is shown with an upper edge 38 and a lower edge 40. In addition, first inwardly radial shoulder 34 is provided with a posterior edge 42 and anterior edge 44. As further shown in FIG. 4, duct 26 includes duct threads 46 formed on inner surface 32 of duct 26. Duct threads 46 are formed for threadable engagement with arbor threads 48 on arbor 14, as best shown in FIG. 1B. In a preferred embodiment of the present invention, duct threads 46 are left-handed threads, or reversed threads, to enhance self-tightening of the present invention during rotation of the arbor when brake lathe 16 is in operation, but left-handed threads are not a limitation of the present invention.

Figure 3A:
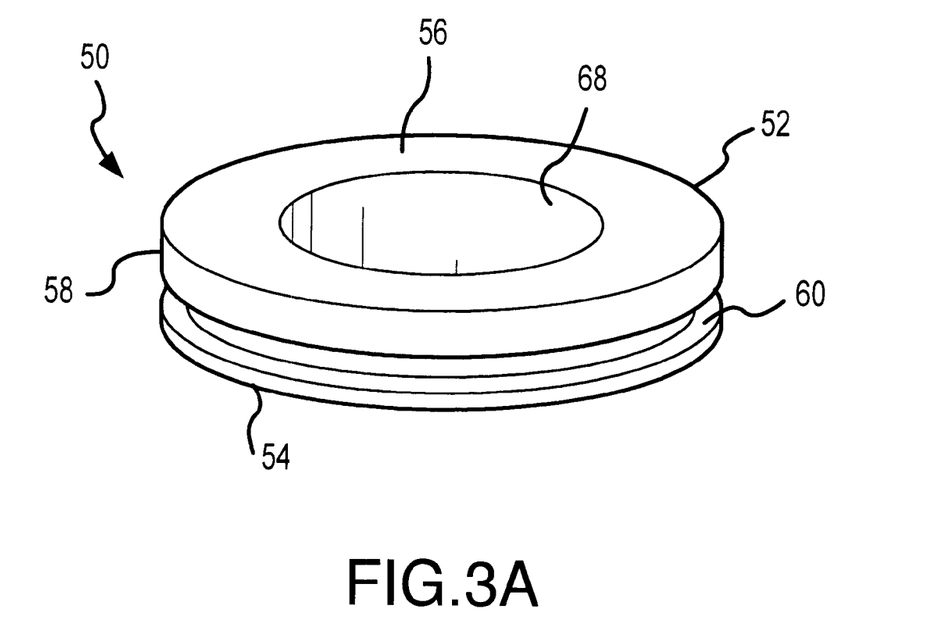
FIG. 3A is a perspective view of the swivel of the self-aligning arbor nut system.
Figure 3B:
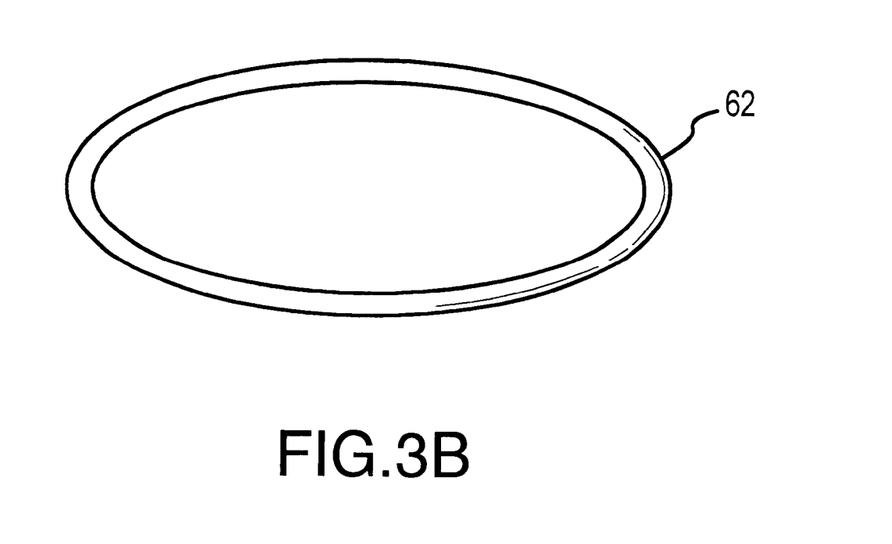
FIG. 3B is a perspective view of the o-ring of the present invention.

Self-aligning arbor nut system 10 of the present invention also includes a swivel 50 in the form of, and also referred to as, a ring 52 as shown by cross-reference among FIGS. 2A, 3A and 4. Swivel 50 is formed with a fore end 54, an aft end 56, and a wall 58 between fore end 54 and aft end 56 of swivel 50. In a preferred embodiment of the present invention, an annular groove 60 is formed in wall 58 of swivel 50, as best shown in FIG. 4. Annular groove 60 is dimensioned to receive an o-ring 62 that is insertable into annular groove 60. A complementary structure is provided in duct 26 of body 18 of the present invention. Specifically, a first slot 64 is formed in inner surface 32 of duct 26 adjacent following end 30 of duct 26 for engagement with o-ring 62. A second slot 66 is likewise formed in inner surface 32 of duct 26 adjacent leading end 28 of duct 26. In a preferred embodiment of the present invention, first slot 64 is formed in inner surface 32 of duct 26 between upper edge 38 of second inwardly radial shoulder 36 and following end 30 of body 18. In addition, duct threads 46 are formed in inner surface 32 of duct 26 between lower edge 40 of second inwardly radial shoulder 36 and a determinable distance, identified as $D^1$ along inner surface 32 of duct 26. The distance $D^2$, as shown in FIG. 4, is not the same length or dimension as distance $D^1$. The differences in lengths $D^1$ and $D^2$ in part contribute to imparting to the present invention reversibility: swivel 50, as shown in FIG. 4 as alternate swivel 50', also may be inserted into duct 26 against second inwardly radial shoulder 36 adjacent leading end 28 of body 18 to adjust use of self-aligning arbor nut system 10 on arbor 14 to adjust usage of the present invention for varying dimensions of arbor 14 and to adjust for varying dimensions of the work pieces comprising brake lather adapter system 12 and rotor 67 as shown in FIGS. 1A and 1B. Swivel 50 of the present invention also includes an interior face 68 as shown in FIG. 4. In a preferred embodiment of the present invention, fore ends 54 and 54' are shown in FIG. 4 to be substantially convex in shape to mate with the reciprocally substantially concave shape respectively of first inwardly radial shoulder 34 or second inwardly radial shoulder 36.

As shown by cross-reference 1A, 2B and 4, the preferred embodiment of the present invention also includes means for demountably securing to, and removing from, self-aligning arbor nut system 10 to arbor 14. One such means includes a key 70 as shown in FIG. 1A which may be inserted into at least one bore 72 which may be formed through outside surface 24 of body 18. In a preferred embodiment of the present invention, a circumferential depression 74 is formed substantially around and at the middle of body 18 in outside surface 24 of body 18, and the at least one bore 72 is formed in circumferential depression 74. As will be evident to one skilled in the art, circumferential depression 74 is not a limitation of the present invention. Key 70 is used primarily for removing self-aligning arbor nut system 10 from arbor 14 rather than for securing self-aligning arbor nut system 10 to arbor 14. The primary means for demountably securing self-aligning arbor nut system 10 to arbor 14 includes the application of hand pressure and a twisting motion to and on a series of indentations, or knurled surfaces, 76 formed on outside surface 24 of body 18 between circumferential depression 74 and distal end 20 of body 18, and proximal end 22 of body 18.

OPERATION

In operation, body 18, swivel 50, o-ring 62, at least one bore 76, and the series of indentations, or knurled surfaces, 80 combine to solve the problems and to achieve the advantages noted above. O-ring 62 is inserted into annular groove 60 of swivel 50. Swivel 50 is pressed into duct 26 at following end 30 of duct 26. Fore end 54 of swivel 50 is shaped to lie snugly and substantially coincident with second inwardly radial shoulder 36, as best shown in FIG. 1. A portion of aft end 56 of swivel 50 protrudes above following end 30 of body 18.

Gripping outside surface 24 where series of indentations, or knurled surface, 80 are located, the user of the present invention may tighten self-aligning arbor nut system 10 onto arbor threads 48, and against at least one of the components of brake lathe adapter system 12. To release self-aligning arbor nut system 10 from arbor 14, the user also may apply hand pressure, or may engage key 70 by inserting key 70 into at least one bore 72, and apply hand pressure to release the present invention from arbor 14. Swivel 50, also shown in FIG. 4 as swivel 50', is inserted into duct 26 against second inwardly radial shoulder 36 adjacent leading end 29 of body 18, or may be inserted into leading end 28 of duct 26 so that for end 54' may rest against second inwardly radial shoulder 36, thus providing reversibility of use of self-aligning arbor nut system 10 to adjust for varying dimensions of the work pieces comprising brake lather adapter system 12 and rotor 67 as shown in FIGS. 1A and 1B, or to adjust for varying dimensions of arbor 14.

If arbor 14 is bent or distorted, self-aligning arbor nut system 10 aligns itself due to the structure, and cooperation of structural elements, among body 18, swivel 50, and o-ring 62. O-ring 62 in annular groove 60 of swivel 50 is demountably connectable to first slot 64, or alternatively second slot 66, of body 18. Although swivel 50 or 50' is therefore demountably secured in either leading end 28 or following end 30 of duct 26, o-ring 62 provides flexibility of movement of swivel 50 in relation to, and from, a longitudinal axis through body 18, allowing swivel 50 to help prevent and compensate for any bend or distortion in arbor 14, in turn allowing the operator of brake lathe 16 to achieve proper parallelism in a resurfaced rotor 67 or other item attached to rotor 14 for resurfacing or working by the operator.

While the self-aligning arbor nut system shown in drawing FIGS. 1A through 4 is one embodiment of the present invention, it is merely one embodiment, is not intended to be exclusive, and is not a limitation of the present invention. While the particular self-aligning arbor nut system as shown and disclosed in detail in this instrument is fully capable of obtaining the objects and providing the advantages stated, this disclosure is merely illustrative of the presently preferred embodiments of the invention, and no limitations are intended in connection with the details of construction, design or composition other than as provided and described in the appended claims.

What is claimed is:

1. A self-aligning arbor nut system, comprising:
   a body formed with a duct having a leading end and a following end;
   a swivel engageable with at least one end of the duct,
      wherein the swivel includes a fore end, an aft end, a wall therebetween, and an annular groove formed in the wall; and
   means for demountably securing the system to the arbor.

2. A self-aligning arbor nut system as recited in claim 1, wherein the body is made of a single material.

3. A self-aligning arbor nut system as recited in claim 1, wherein the body is provided with a distal end, a proximal end, and an outside surface therebetween.

4. A self-aligning arbor nut system as recited in claim 1, wherein the duct includes a leading end, a following end, and an inner surface therebetween.

5. A self-aligning arbor nut system as recited in claim 4, wherein the duct is formed with a first inwardly radial shoulder adjacent the leading end of the duct.

6. A self-aligning arbor nut system as recited in claim 5, wherein the duct is formed with a second inwardly radial shoulder adjacent the following end of the duct.

7. A self-aligning arbor nut system as recited in claim 4, further comprising threads formed partially on the inner surface of the duct for engagement with the arbor.

8. A hand-torquable self-aligning nut removably mountable on an arbor for a holding a rotating workpiece, comprising:
   a body having a distal end, a proximal end, and an outside surface therebetween;
   a duct formed through the body substantially coincident with the longitudinal axis of the body, the duct having a leading end, a following end, and an inner surface therebetween;
   a ring engageable with either end of the duct and with the arbor, the ring formed with a fore end, an aft end, and a wall therebetween,
      wherein the ring is formed to provide parallelism of the rotating workpiece;

an elastomeric o-ring engageable with the wall of the ring and the inner surface of the duct;

one or more bores formed in the outside surface of the body; and a knurled surface installed on the outside surface of the body between the distal end and proximal end of the body respectively.

9. A hand-torquable self-aligning nut removably mountable on an arbor as recited in claim 8, wherein the fore end of the ring is substantially convex.

10. A self-aligning arbor nut system as recited in claim 1, further comprising a o-ring insertable into the annular groove in the wall of the swivel.

11. A self-aligning arbor nut system as recited in claim 4, wherein a first slot is formed in the inner surface of the duct adjacent the following end of the body for engagement with the o-ring.

12. A self-aligning arbor nut system as recited in claim 11, wherein a second slot is formed in the inner surface of the duct adjacent the leading end of the body.

13. A self-aligning arbor nut system as recited in claim 1, wherein a bore is formed through the outside surface of the body for removable engagement by a key.

14. A hand-torquable self-aligning nut removably mountable on an arbor as recited in claim 8, wherein the duct is formed with a first inwardly radial shoulder adjacent the leading end of the duct, and further wherein the first inwardly radial shoulder is substantially concave.

15. A hand-torquable self-aligning nut removably mountable on an arbor as recited in claim 14, wherein the duct is formed with a second inwardly radial shoulder adjacent the following end of the duct, and further wherein the second inwardly radial shoulder is substantially concave.

16. A hand-torquable self-aligning nut removably mountable on an arbor as recited in claim 15, wherein the fore end of the ring is shaped and sized for engagement with at least the second inwardly radial shoulder of the duct.

17. A hand-torquable self-aligning nut removably mountable on an arbor as recited in claim 15, wherein the second inwardly radial shoulder includes a upper edge and lower edge.

18. A hand-torquable self-aligning nut removably mountable on an arbor as recited in claim 17, wherein a first slot is formed in the inner surface of the duct between the upper edge of the second inwardly radial shoulder and the following end of the body, for engagement with a portion of the o-ring.

19. A hand-torquable self-aligning nut removably mountable on an arbor as recited in claim 18, wherein threads are formed in the inner surface of the body between the lower edge of the second inwardly radial shoulder and a determinable distance along the inner surface of the duct.

* * * * *

UNITED STATES PATENT AND TRADEMARK OFFICE
CERTIFICATE OF CORRECTION

PATENT NO. : 6,631,660 B1
DATED : October 14, 2003
INVENTOR(S) : Kenneth Turos

It is certified that error appears in the above-identified patent and that said Letters Patent is hereby corrected as shown below:

<u>Title page,</u>
Item [54], "SELF-ALIGNING ARBOR SYSTEM" is changed to read
-- SELF ALIGNING ARBOR NUT SYSTEM --.

Signed and Sealed this

Tenth Day of February, 2004

JON W. DUDAS
*Acting Director of the United States Patent and Trademark Office*